United States Patent [19]

Nemoto

[11] Patent Number: 4,678,138

[45] Date of Patent: Jul. 7, 1987

[54] MAGNETIC TAPE CASSETTE WITH REEL BRAKE MECHANISM

[75] Inventor: Tsuneo Nemoto, Miyagi, Japan

[73] Assignee: Sony Corporation, Tokyo, Japan

[21] Appl. No.: 793,549

[22] Filed: Oct. 31, 1985

[30] Foreign Application Priority Data

Nov. 2, 1984 [JP] Japan .............. 59-167213[U]

[51] Int. Cl.$^4$ .................. G11B 15/22; G11B 23/04
[52] U.S. Cl. ................................ 242/198; 360/132
[58] Field of Search ............... 242/198, 199; 360/132

[56] References Cited

U.S. PATENT DOCUMENTS

| 3,070,322 | 12/1962 | Razis | 242/198 |
| 4,004,752 | 1/1977 | Kamaya | 242/198 |
| 4,214,719 | 7/1980 | Kato | 242/198 |
| 4,225,100 | 9/1980 | Sugawara | 242/198 |
| 4,537,367 | 8/1985 | Herrington | 242/198 |
| 4,572,461 | 2/1986 | Horikawa | 242/198 |

FOREIGN PATENT DOCUMENTS 60-63780 4/1985 Japan .
636046 4/1950 United Kingdom .

Primary Examiner—Stuart S. Levy
Assistant Examiner—Katherine Matecki

[57] ABSTRACT

A magnetic tape cassette is provided with a reel brake and a tape-protecting lid. The tape-protecting lid has side plates extending parallel to the side walls of the cassette casing and pivoted on the side walls. The reel brake mechanism comprises a brake plate free to move between a braking position and a brake-release position and normally biased toward the braking position. One of the reel brake plate and the side wall of the casing is provided with means for maintaining interengagement between the reel brake plate and the side wall so as to ensure cooperation therebetween for automatic brake release in response to opening of the tape-protecting lid.

11 Claims, 11 Drawing Figures

MAGNETIC TAPE CASSETTE WITH REEL BRAKE MECHANISM

BACKGROUND OF THE INVENTION

The present invention relates generally to a magnetic tape cassette. More specifically, the invention relates to a tape cassette enclosing a magnetic tape wound onto tape reels and a reel brake which can be released by opening a tape-protecting lid.

It is well known that recording and reproduction of data, such as audio signals, is facilitated by utilizing a magnetic tape cassette and a recording and reproduction apparatus adapted for use with cassettes. It is also well known that by providing a reel brake mechanism, unintentional unwinding of the tape from the tape reels can be successfully prevented. In known structures, a reel brake is normally biased toward the tape reel to ensure braking engagement with the latter.

When such a tape cassette is loaded into the recording and reproduction apparatus, it is necessary to release the braking engagement between the reel brake and the tape reel. A brake release mechanism has been proposed which operates the reel brake mechanism via a tape-protecting lid which covers the front mouth of the tape cassette. In the proposed mechanism, the reel brake mechanism cooperates with the tape-protecting lid to be actuated between its braking state and its brake-release state. It should be noted that, throughout the disclosure, the wording "braking state" is used to represent the reel brake position in which rotation of the tape reels are restricted or prevented, and the wording "brake-release state" represents the reel brake position in which the reel brake is separated from the tape reel and so allows free rotation of the tape reels.

The known brake release mechanism cooperates with the tape protecting lid via a side plate of the latter. Specifically, in the known mechanism, the reel brake has a transversely extending strip which is positioned opposite the side plate of the tape-protecting lid. When the tape-protecting lid opens the front mouth of the tape cassette, the side plate pushes the strip of the reel brake in the brake-release direction to move the latter to the brake-release state.

In this structure, a deformed side plate could prevent cooperation between the reel brake and the tape-protecting lid. This prevents release of the reel brake upon opening the tape-protecting lid. Since the reel brake prevents the tape reels from rotating as set out above, recording and reproduction becomes impossible.

SUMMARY OF THE INVENTION

Therefore, it is an object of the present invention to provide a magnetic tape cassette which ensures cooperation between a reel brake mechanism and a tape-protecting lid.

In order to accomplish the aforementioned and other objects, a magnetic tape cassette, according to the present invention, is provided with a reel brake and a tape-protecting lid. The tape-protecting lid has side plates extending essentially parallel to the side walls of the cassette casing and which are pivoted on the side walls. The reel brake mechanism comprises a brake plate free to move between a braking position and a brake releasing position and biased toward the braking position. Either the reel brake plate or the side wall of the casing is provided with means for maintaining interengagement between the reel brake plate and the side wall so as to ensure cooperation therebetween for automatic brake release in response to opening of the tape-protecting lid.

According to one aspect of the invention, a magnetic tape cassette comprises a cassette casing housing a tape reel onto which a magnetic tape is wound, a movable tape-protecting lid for selectably covering and exposing a front mouth of the casing, the tape-protecting lid having a side plate extending substantially parallel to side walls of the casing and pivoted thereon, a reel brake disposed within the casing and movable between a reel brake disposed within the casing and movable between a reel brake state and a brake-release state, the reel brake being biased toward the reel brake state, in which it restricts rotation of the tape reels, a first strip section integral with the side plate of the tape-protecting lid and movable between a first position corresponding to a closed position of the tape-protecting lid and a second position corresponding to an open position of the tape-protecting lid, a second strip section integral with the reel brake and actuated by the first strip to the reel brake state corresponding to the first position of the first strip and to the brake release state corresponding to the second position of the first strip, and means for establishing interengagement between the first and second strips, the interengagement means comprising a recessed section on the one of the first and second strips for retaining a corresponding section of the other of the first and second strips.

According to another aspect of the invention, a magnetic tape cassette comprises a cassete casing housing a tape reel onto which a magnetic tape is wound, a tape-protecting lid for selectably covering and exposing a front mouth of the casing, the tape-protecting lid having a side plate extending substantially parallel to side walls of the casing and pivoted thereon, a reel brake disposed within the casing and movable between a reel brake state and a brake-release state, the reel brake being normally biased toward the reel brake state in which it restricts rotation of the tape reels, a first section integral with the side plate of the tape-protecting lid and movable between a first position corresponding to a closed position of the tape-protecting lid and a second position corresponding to an open position of the tape-protecting lid, a second section integral with the reel brake and actuated by the first strip to the reel brake state corresponding to the first position of the first strip and to the brake-release state corresponding to the second position of the first strip, and means for restricting displacement of the first section relative to the second section and thereby ensuring cooperation between the tape-protecting lid and the reel brake.

The first section is offset rearward or forward of the pivot point of the side plate and pivots about the pivot point between the first and second positions.

The reel brake has a rearward extending braking strip engageable to a braking wheel integral with the tape reel in the braking state of the reel brake, and a second section essentially parallel to the side wall of the cassette casing.

The first section is located behind the retaining means, and the retaining means comprises a recess in the second section receiving the first strip, the walls of the recess restricting transverse displacement of the first section. The retaining means comprises a generally L-shaped hook in the second section defining the recess.

In an alternative embodiment, the inner walls of the recess are tapered to define a generally V-shaped recess, and the first section is wedge-shaped, conforming the V-shaped recess. The V-shaped recess is so formed as to produce an inward counterforce against any deformation forces exerted outward on the first section.

BRIEF DESCRIPTION OF THE DRAWINGS

The present invention will be understood from the detailed description given herebelow and from the accompanying drawings of the preferred embodiments of the invention, which, however, should not be taken to limit the invention to the specific embodiments but are for explanation and understanding only.

In the drawings.

DESCRIPTION OF THE PREFERRED EMBODIMENT

Figure 1:
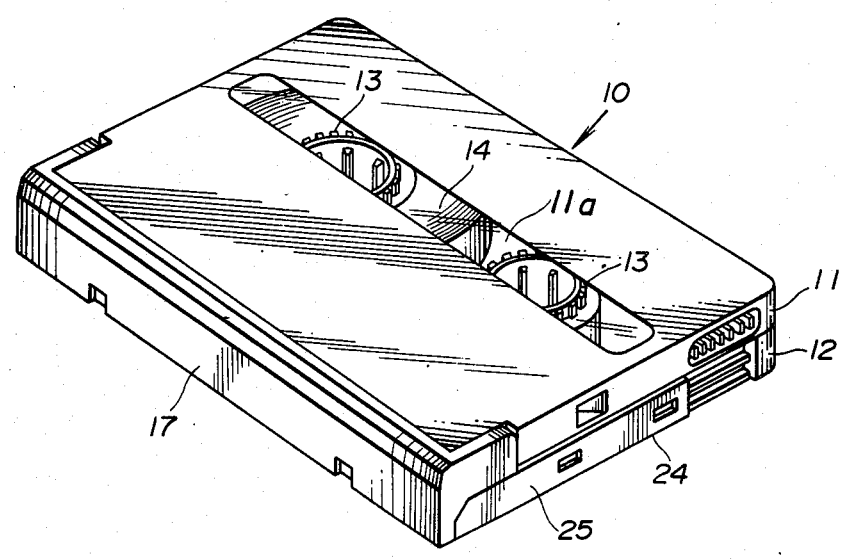
FIG. 1 is a perspective view of the preferred embodiment of a magnetic tape cassette in accordance with the present invention, in which a tape-protecting lid and a sliding closure member are in their closed positions.
Figure 2:
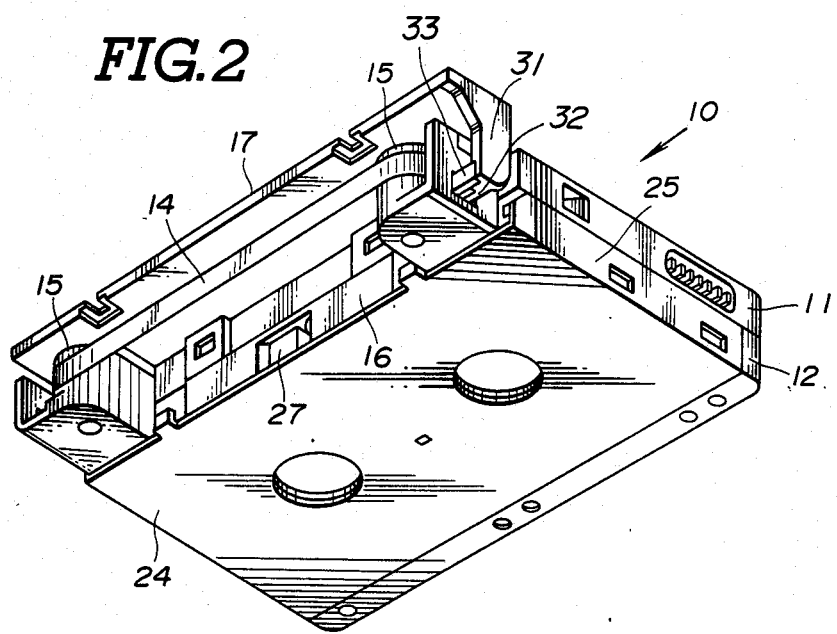
FIG. 2 is a perspective view of the magnetic tape cassette of FIG. 1, viewed from below the cassette, in which the tape-protecting lid and the sliding closure member are in their open positions during use of the cassette.
Figure 3:
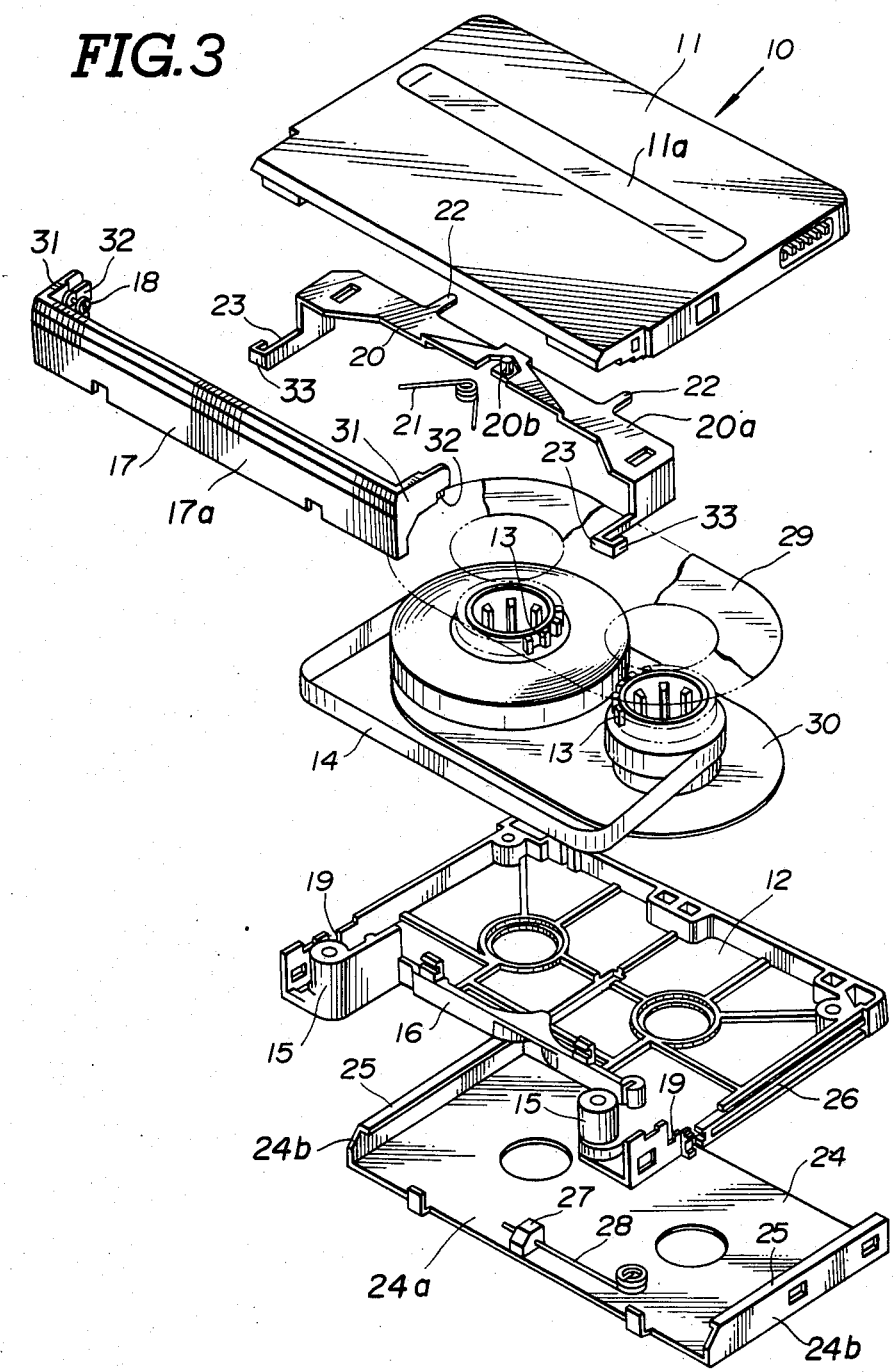
FIG. 3 is an exploded perspective view of the magnetic tape cassette of FIG. 1.

Referring now to the drawings, particularly to FIGS. 1 to 3, the preferred embodiment of a magnetic tape cassette according to the present invention generally comprises a casing 10 including an upper section 11 and a lower section 12 which are connected by threaded bolts (not shown) in a per se well-known manner to form a single unit. A transparent window plate 11a is built into the upper surface of the upper section 11. A pair of reel hubs 13 housed within the cassette casing 10 rotatably engage a pair of reel shaft insertion apertures. The apertures are formed in the lower section 12 at predetermined positions which establish a suitable spacing between the reel hubs 13. A magnetic tape 14 is wound around the reel hubs 13. Upper and lower sheet bearings 29 and 30 are provided between the reel hubs 13 and the upper and lower sections 11 and 12 respectively.

A tape-protecting pivotal lid 17 is rotatably or pivotally attached to the right and left side walls of the cassette casing near the front edge of the tape cassette. When the tape-protecting lid 17 is pivoted away from the front surface of the tape cassette, the magnetic tape 14 is exposed. An essentially rectangular cut-out is formed in the front end of the lower section 12. When the magnetic tape cassette is inserted into PCM recorder which will be briefly discussed later, a tape guide system or a device constituting part of a tape retaining mechanism (not shown), which pulls out some of the tape 14 for loading onto a rotary head of the PCM recorder, is inserted into the cut-out portion. A sliding closure member 24 engages the lower section 12 and covers and exposes the cut-out portion as it slides back and forth.

While the tape cassette is not in use, the tape-protecting lid 17 lies opposite the front opening in the front surface of the casing 10 to cover the latter. At the same time, the sliding closure 24 is in its forwardly-shifted position in which it covers the cut-out portion of the lower section 12 and thus prevents the tape guide system from reaching into the tape cassette for the tape. The tape-protecting lid 17 can pivot away from the front surface of the cassette to expose the magnetic tape 14, and the sliding closure member 24 can move to the rear to expose the cut-out portion so that the tape guide system can reach into the cut-out portion to draw some of the magnetic tape 14 out of the cassette casing for loading onto a rotary drum for recording or playback. Thereafter, when the recording or playback is over and the tape cassette is returned to the stand-by state, the tape-protecting lid 17 and the sliding closure member 24 are returned to the aforementioned closed positions. Throughout the rest of this document, the positions of the tape-protecting lid 17 and the sliding closure member 24 in which they cover the front opening and the cut-out portion respectivly will be referred to as "stand-by position" and the position of the lid 17 and the closure member 24 in which they expose the front opening and the cut-out portion will be referred to as "use position".

Figure 4:
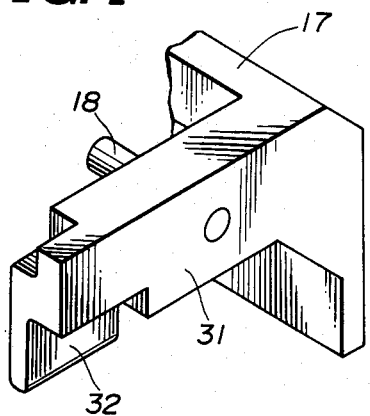
FIG. 4 is an enlarged partial perspective view showing a major part of the preferred embodiment of the tape-protecting lid.

The cassette casing 10 also has a pair of integral tape guide columns 15 on the left and right sides of the front edge of the lower section 12, as shown in FIG. 4. The magnetic tape 14 is stretched between and around the tape guide columns 15 so as to follow a predetermined tape run or path along the front edge of the tape cassette and across the front opening over the rotary head.

The essentially rectangular cut-out portion of the lower section 12 extends over a predetermined width so as to expose the rear surface of the magnetic tape 6 stretched between the tape guide columes 15. During recording or reproduction, a device constituting part of the tape handling system or the tape guide system projects into the cut-out portion and draws out a section of the magnetic tape 14. The tape handling system is part of the PCM recorder.

The tape-protecting lid 17 is elongated along the major dimension of the front opening and has side plates 17a serving as pivot arms and projecting from its opposite ends which pivotably attach the tape-protecting lid 17 to the front of the cassette casing 10 by means of pivot shafts 18. Thus, the tape-protecting lid 17 can be pivoted to selectively cover and expose the front opening of the cassette casing 10. The tape-protecting lid 17 also comprises a plate 17a which is elongated in the direction of the opening in the cassette casing 10 and covers the entire length of the front of the cassette casing 10. When the tape-protecting lid 8 is rotated to the closed position to cover the front of the cassette casing 10, the side plates 31 lie flush with the contours of the upper section 11 as best shown in FIG. 1. When the tape-protecting lid 17 is in this position, the closure member 24 is held in its forward position under the side plate 31 as shown in FIG. 1 by means described later. The pivot shafts 18 (only one of which is visible in FIG. 4) about which the tape-protecting lid 17 pivots are approximately centered on the inner surfaces of the respective side plates 31.

The sliding closure member 24 has a flattened U-shaped configuration and is so mounted on the lower section 12 of the cassette casing 10 that it can slide back and forth parallel to the lower surface of the lower cassette section 12. Apertures respectively corresponding to the reel shaft insertion apertures of the lower section 12 are formed in the sliding closure member 9 in such positions that after the sliding closure member 24 slides all the way backwards to expose the cut-out portion, the apertures are respectively aligned with the reel shaft insertion apertures.

The sliding closure member 24, as shown in FIG. 4 comprises a flat plate 24a which lies parallel to the lower surface of the lower section 12 and side plates 24b along the left and right sides of the flat plate 9c which lie parallel to the outer surfaces of the left and right side walls of the lower section 12. Flanges 25 are formed by bending the upper edges of the side plates 24b inwards. The flanges 25 engage guide recesses 26 in the side wall of the lower sections 12. After assembly, a spring anchor 27 on the flat plate 24a projects through a spring-accomodating slot in the shielding plate 16 of the lower section 12. The spring anchor 27 anchors one end of a tension coil spring 28 designed to bias the closure member 24 forward. The other end of the tension coil spring 28 engages a spring- engaging column disposed near the cut-out of the lower section 12, with the result that the closure member 24 is biased foward toward its stand-by position.

FIG. 3 shows the relative position of the tape-protecting lid 17, the sliding closure member 24, a reel brake member 20, which is described below, the upper section 11 and the lower section 12. Each of these components may be made of synthetic resin, such as ABS resin. The lower section 12 comprises an essentially rectangular flat plate of in which the reel shaft insertion apertures are formed and a frame including left and right side walls, a front portion in which the tape guide columns 15 are formed and a rear wall. Most of the side walls and the outer surface of the flat plate of the lower section 12 are recessed so that the sliding closure member 24 lies flush with the outer surface of the remainder of the side walls and floor of the lower section 12.

Figure 7:
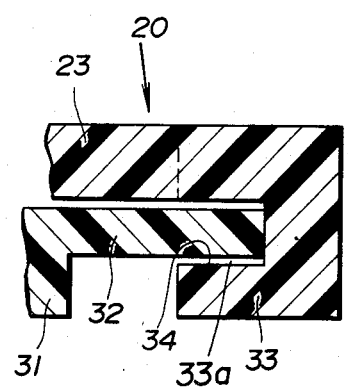
FIG. 7 is a further enlarged section taken along line VII—VII of FIG. 6.
Figure 8:
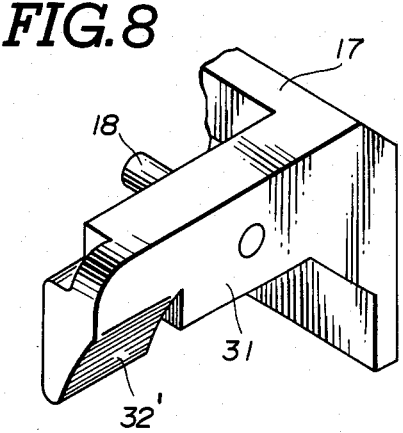
FIG. 8 is an enlarged partial perspective view of a major part of a modification to the preferred embodiment of the tape-protecting lid of FIG. 4.
Figure 9:
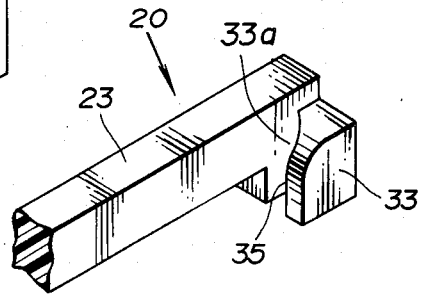
FIG. 9 is an enlarged partial perspective view of a major part of a modification to the preferred embodiment of a reel brake plate of FIG. 5.
Figure 10:
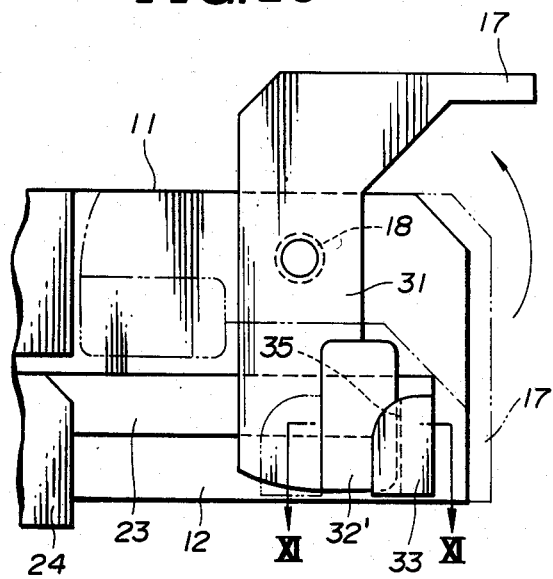
FIG. 10 is an enlarged partial side elevation of a major section of the magnetic tape cassette, which illustrates the cooperation between the reel brake mechanism of FIG. 9 and the tape-protecting lid of FIG. 8.
Figure 11:
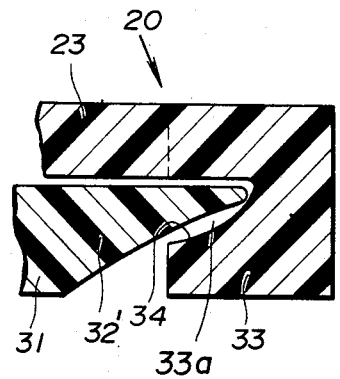
FIG. 11 is a further enlarged section taken along line XI—XI of FIG. 10.

As shown in FIGS. 3 and 7, the front ends 32 of the left and right side plates 31 are stepped laterally inwards and essentially as thick as the width of the recess 33a. The tops of the side walls of the lower section 11 have indentations 19. When the upper section 11 and lower section 12 are assembled together, the indentations 19 oppose indentations in the side walls of the upper section 11. The indentations then form apertures allowing pivotal mounting of the rotary shafts 18 of the tape-protecting lid 17. Rectangular insertion apertures 12a are formed near the front, lower corners of the support walls 12. Shields 14a, 14b and 14c define the three walls of the cut-out portion 3a, whereby the inside of the cassette casing 10 is shielded from the cut-out portion 3a.

The reel brake member 20 comprises a slide guide plate 20a which is elongated in a direction parallel to the front opening of the casing and to the lid 17 and lies along the inner surface of the upper section 11. The member 11 also comprises generally L-shaped arms 23 which respectively extend perpendicularly downward from either end of the slide guide plate 20a and then forward. Brake pins 22 extend rearward from the slide guide plate 20a and oppose the respectively corresponding reel hubs 13, each of which is formed with a plurality of braking notches or braking teeth 13a engagable with the corresponding brake pin 22. Braking notches or teeth 13 form brake wheels along the outer peripheries of the reel hubs 13.

Figure 5:
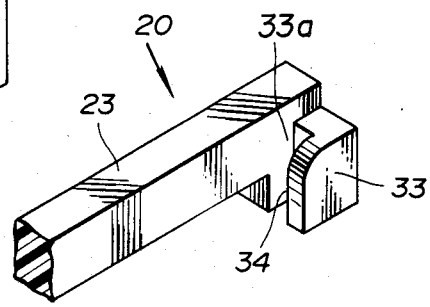
FIG. 5 is an enlarged partial perspective view of a major part of the preferred embodiment of a reel brake plate.
Figure 6:
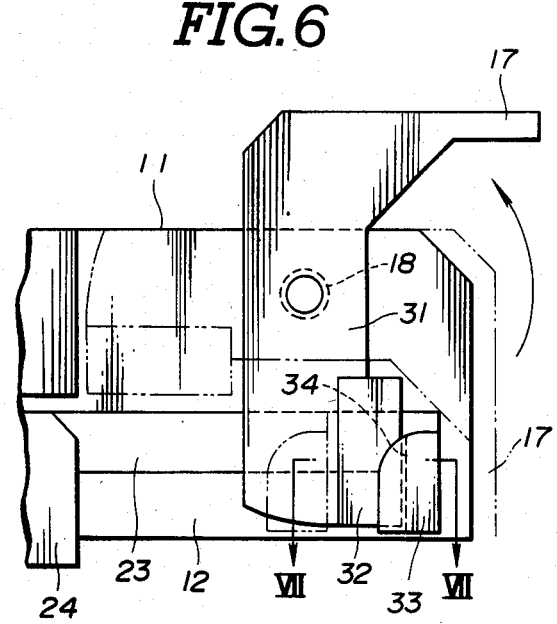
FIG. 6 is an enlarged partial side elevation of a major section of the magnetic tape cassette, which illustrates the cooperation between the reel brake mechanism and the tape-protecting lid.

A spring-retaining stud 20b is provided at the center of the slide guide plate 20a, and operating tabs 33 are formed on the extreme ends of the arms 23. As best shown in FIGS. 5 and 7, the operating tabs 33 are generally L-shaped, defining a recess 33a with the major section of the arm 23. The recess 33a opens toward the front edge 32 of the side plate 31 of the tape-protecting lid 17 and is generally as wide as the thickness of the front edge 32 of the side plate 31. The central coils of a torsion spring 21 used to bias the reel brake member 20 towards its braking position fit over the spring-retaining stud 20b. The free ends of the spring 21 press against the rear of the shield wall 16 (FIG. 3) of the lower section 12 so that the brake pins 22 normally engage the brake wheels of the reel hubs 13, whereby the reel hubs 13 are prevented from rotating.

The reel brake member 20 is so disposed within the cassette casing 10 that the ends of the operating tabs 33 protrude through the insertion apertures of the lower section 12. When the tape-protecting lid 17 is pivoted upwards, the protruding tabs 33 are engaged by the front edges of the side plates 32 of the tape-protecting lid 17, and the reel brake member 20 is pulled forward against the biasing force of the spring 21. The brake pins 22 are thus disengaged from the brake wheels of the reel hubs 13, allowing the reel hubs 13 to rotate. It should be noted that the tape-protecting lid 17 is driven upwards by actuating pins (not shown) of the recording-/playback system when the cassette casing 10 is fully deployed in the operating position. The actuating pins provide the force necessary to overcome the force of the torsion spring 21.

Engagement between the front edge 32 of the side plate 31 and the recess 33a of the operating arm 23 ensures cooperation between the tape-protecting lid and the reel brake member 20. Therefore, release of the reel brake member 20 by opening of the tape-protecting lid 17 can be ensured.

FIGS. 8 to 11 show a modification of the foregoing preferred embodiment of the magnetic tape cassette according to the invention, especially concerning means for actuating the reel brake member 20 by means of the tape-protecting lid 17. In this modification, the operating tab 33 defines a recess 33a which is generally V-shaped with a tapered inner peripheral wall 34. On the other hand, the front edge 32' is wedge-shaped and generally conforms to the recess 33a.

Engagement between the wedge-shaped front edge 32' and the V-shaped recess resists forces which would otherwise cause outward deformation of the side plate 31 of the tape-protecting lid 17. This successfully prevent the side plates 31 from deforming and thus ensures cooperation between the reel brake member 20 and the tape-protecting lid 17.

Therefore, the present invention fulfills all of the objects and advantages sought therefor.

While the specific embodiments have been disclosed in order to facilitate full understanding of the invention, the invention can be modified or embodied in various ways without departing from the principle of the invention which is set out in the appended claims. For example, although the L-shaped operating tab serving as a sort of hook maintaining engagement between the tape-protecting lid and the reel brake member is built into the arm of the reel brake member, it can be part of the side plate instead. Also, any appropriate means which maintains cooperation between the tape-protecting lid and the reel brake member and allows pivotal movement of the tape-protecting lid and linear movement of the reel brake member can be used in embodying the invention.

What is claimed is:

1. A magnetic tape cassette comprising:
   a cassette casing housing a tape reel onto which a magnetic tape is wound;
   a movable tape-protecting lid for selectably covering and exposing a front mouth of said casing, said tape-protecting lid having a side plate extending substantially parallel to side walls of said casing and pivoted thereon;
   a reel brake disposed within said casing and movable between a reel brake state and a brake-release state, said reel brake being biased toward said reel brake state, in which it restricts rotation of said tape reels;
   a first strip section integral with said side plate of said tape-protecting lid and movable between a first position corresponding to a closed position of said tape-protecting lid and a second position corresponding to an open position of said tape-protecting lid;
   a second strip section integral with said reel brake and actuated in a first direction by said first strip to said reel brake state corresponding to said first position of said first strip and to said brake release state corresponding to said second position of said first strip; and
   means for establishing interengagement between said first and second strips, said interengagement means comprising a recessed section on one of said first and second strips for retaining a complementary section of the other of said first and second strips for preventing relative displacement of the strips transverse to said first direction during interengagement of the strips.

2. The magnetic tape cassette as set forth in claim 1, wherein said recessed section is part of said second strip and defines a clearance receiving said first strip.

3. The magnetic tape cassette as set forth in claim 2, wherein said clearance is generally V-shaped and said first strip generally conforms to said clearance.

4. A magnetic tape cassette comprising:
   a cassette casing housing a tape reel onto which a magnetic tape is wound;
   a tape-protecting lid for selectably covering and exposing a front mouth of said casing, said tape-protecting lid having a side plate extending substantially parallel to side walls of said casing and pivoted thereon;
   a reel brake disposed within said casing and movable between a reel brake state and a brake-release state, said reel brake being normally biased toward said reel brake state in which it restricts rotation of said tape reels;
   a first section integral with said side plate of said tape-protecting lid and movable between a first position corresponding to a closed position of said tape-protecting lid and a second position corresponding to an open position of said tape-protecting lid;
   a second section integral with said reel brake and actuated in a first direction by said first strip to said reel brake state corresponding to said first position of said first strip and to said brake-release state corresponding to said second position of said first strip; and
   means for restricting displacement of said first section relative to said section section transversely of said first direction and thereby ensuring cooperation between said tape-protecting lid and said reel brake.

5. The magnetic tape cassette as set forth in claim 4, wherein said first section is offset below the pivotal axis of said side plate and pivots about said pivotal axis between said first and second positions.

6. The magnetic tape cassette as set forth in claim 4, wherein said first section is offset rearward from the pivotal axis of said side plate and pivots about said pivotal axis between said first and second positions.

7. The magnetic tape cassette as set forth in claim 6, wherein said said reel brake has a rearward extending braking strip which engages a braking wheel integral to said tape reel in said braking state of said reel brake, and said second section extends essentially parallel to the side walls of said cassette casing.

8. The magnetic tape cassette as set forth in claim 6, wherein said first section is located behind said restricting means, and said restricting means comprises a rearward-facing recess in said second section for receiving said first strip, the walls of said recess restricting displacement of said first section.

9. The magnetic tape cassette as set forth in claim 8, wherein said restricting means comprises a generally L-shaped hook formed in said second section and defining said recess.

10. The magnetic tape cassette as set forth in claim 9, wherein the walls of said recess are tapered to define a generally V-shaped recess, and said first section has a wedge-shaped edge generally conforming to said V-shaped recess.

11. The magnetic tape cassette as set forth in claim 10, wherein said V-shaped recess is so aligned as to produce a inward counterforce against outward forces exerted on said first section.

* * * * *